No. 853,333. PATENTED MAY 14, 1907.
C. A. BACKSTROM.
COIL CLAMP FOR ROTARY MAGNETS.
APPLICATION FILED MAR. 28, 1904.
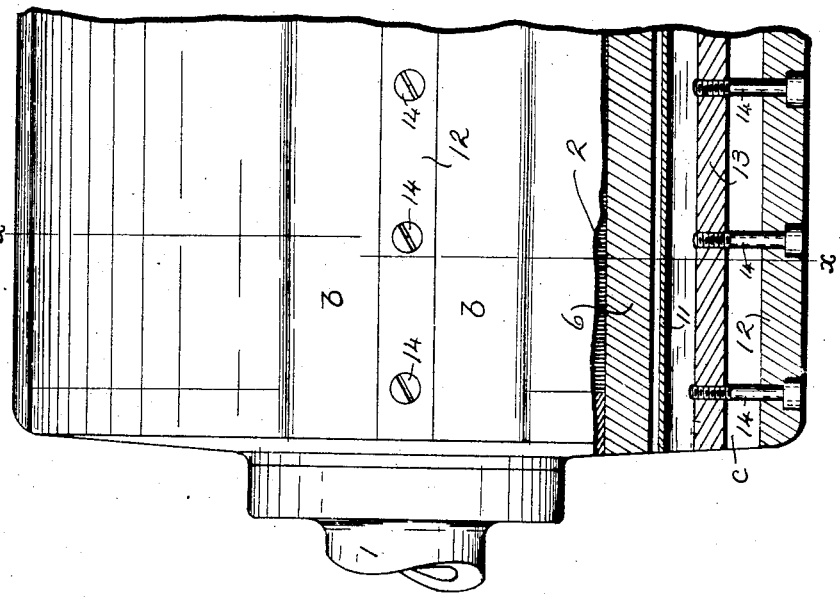
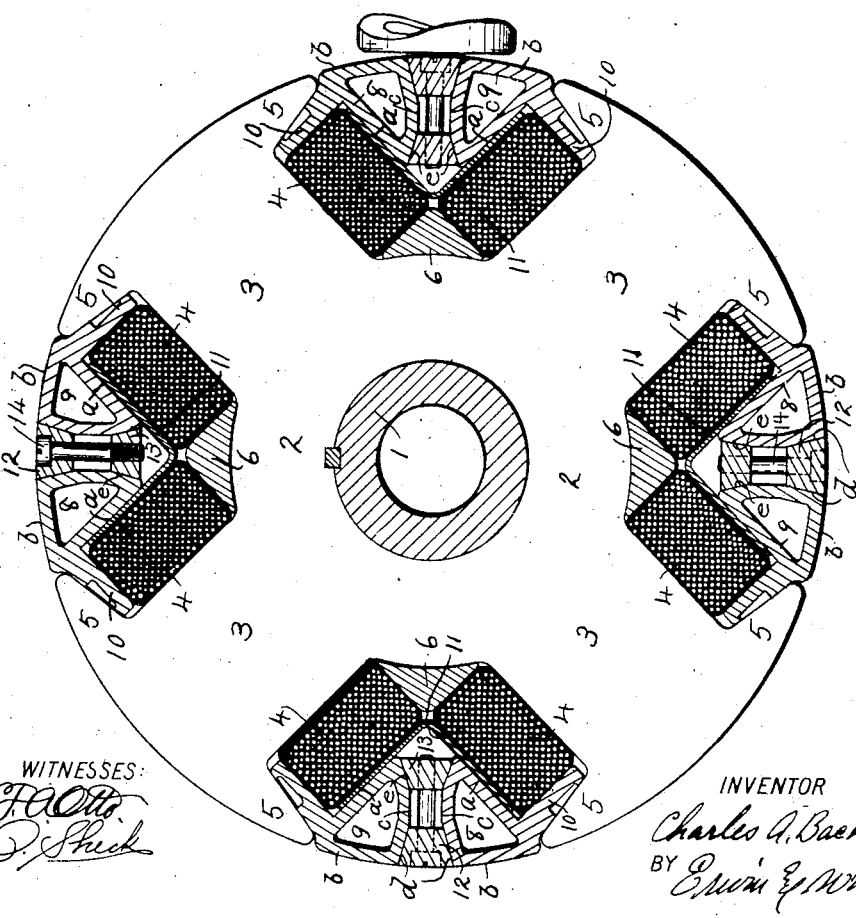
WITNESSES:
INVENTOR
Charles A. Backstrom
BY Erwin E. Wheeler
ATTORNEYS

UNITED STATES PATENT OFFICE.

CHARLES A. BACKSTROM, OF MILWAUKEE, WISCONSIN, ASSIGNOR TO BACK-STROM-SMITH STEAM TURBINE & MANUFACTURING COMPANY, A CORPORATION OF WISCONSIN.

COIL-CLAMP FOR ROTARY MAGNETS.

No. 853,333.  Specification of Letters Patent.  Patented May 14, 1907.

Application filed March 28, 1904. Serial No. 200,356.

*To all whom it may concern:*

Be it known that I, CHARLES A. BACKSTROM, a citizen of the United States, residing at Milwaukee, county of Milwaukee, and State of Wisconsin, have invented new and useful Improvements in Coil-Clamps for Rotary Magnets, of which the following is a specification.

My invention relates to improvements in coil clamps for rotary field magnets.

The objects of my invention are to provide means for securely binding the coils in position, whereby such field magnets may be driven at high speed and may be coupled directly to the shafts of turbines without danger of centrifugal disintegration. Also to provide a form of construction in which fanning will be avoided.

In the following description reference is had to the accompanying drawings in which,— Figure 1 is a cross sectional view of a rotary field magnet embodying this invention. Fig. 2 is a side view partly in section of one end of the same.

Reference letters are used consistently.

1 is a tubular shaft of a field magnet of which 2 is the core, 3 the pole pieces and 4 the coils over which the polar projections 5 extend.

6 are insulation blocks. Clamping members 8 and 9, having a generally triangular form in cross section, are located in the angular spaces between the coils and are each provided with one inner face *a* parallel with the coil and another face *b*, curved in correspondence with the outer circle of magnet rotation. The opposing faces of the respective members are substantially parallel at *c* along the central portions of such faces and diverge outwardly and inwardly at *d* and *e* respectively. The members are also each provided with a wedge shaped projection 10 which extends into spaces provided therefor between the coils and the polar projections 5. A V shaped bearing plate 11 is located in the angle formed by adjacent coils, with its sides interposed between the coils and the faces *a* of the clamping members.

Wedge bars 12 and 13 are located between the faces *d—d* and *e—e* of the clamping members respectively and are drawn toward each other by bolts 14, the bars moving along the converging faces *d—d* and *e—e* to separate the clamping members, thereby causing the faces *a* thereof to bind forcibly against the bearing plate 11 at the sides of the coils and forcing the wedge projections 10 into the spaces between the respective coils and their overlapping polar projections 5. The clamping members 8 and 9 and wedge bars 12 and 13 extend from one end of the field magnet to the other, although for convenience, they may be formed in sections if desired.

The bolts 14 are inserted at intervals as indicated in Fig. 2. The wedge projections 10 are preferably channeled at 16 in order to insure marginal contact with the polar projections. The outer faces *b* of the members 8 and 9 being curved in substantial correspondence with the outer circle of rotation, it is obvious that fanning will be avoided, as the two members, taken with the outer wedge bar 12 and the polar projections 5 form a substantially perfect cylinder. It will of course be understood that the clamping members are of non-magnetic material.

Having thus described my invention, what I claim as new and desire to secure by Letters Patent is,—

1. In a rotary field magnet having pole pieces projecting over the coils; a set of clamping members formed to bear against the sides of the coils and to fit angular spaces between such coils and the pole piece projections; the opposing faces of the clamping members being formed to diverge inwardly and outwardly from an intermediate point; wedges inserted between the diverging faces of the pole pieces; and means for actuating said wedges.

2. In a rotary field magnet having polar projections partially covering the coils and arranged with angular spaces between them and the coils,—a set of clamping members having wedge shaped portions fitting said spaces and other portions projecting inwardly at the side of the coils; and means for pressing said clamping members in the direction of the coils and said angular spaces.

3. In a rotary field magnet, a set of clamping members each formed to bear against two sides of a magnet coil; a set of wedges between clamping members; and means for actuating the wedges to press the clamping members against the respective coils.

4. In a rotary field magnet having polar projections partially covering the coils, a set of clamping members between adjacent coils, each having a wedge shaped projection between a coil and the corresponding polar projection; wedges movably located between the clamping members, and means for actuating the wedges to separate the clamping members and press them in the direction of the coils.

5. In a rotary field magnet having polar projections partially covering the coils; a set of clamping members between adjacent coils, each having a wedge shaped projection between a coil and the corresponding polar projection; wedges movably located between the clamping members; and means for actuating the wedges to separate the clamping members and press them in the direction of the coils; said clamping members and wedges being arranged to substantially fill the spaces between adjacent coils and pole pieces.

6. In a rotary field magnet having polar projections partially covering the coils; a set of clamping members between adjacent coils, each having a wedge shaped projection between a coil and the corresponding polar projection; wedges movably located between the clamping members and means for actuating the wedges to separate the clamping members; and press them in the direction of the coils; said clamping members and wedges being arranged to substantially fill the spaces between adjacent coils and pole pieces; and said polar projections and clamping members being formed with outer surfaces curved substantially in conformity with the outer circle of revolution.

7. In a rotary field magnet having polar projections partially covering the coils; a set of clamping members between adjacent coils, each having a wedge shaped projection between a coil and the corresponding polar projection; wedges movable in opposite directions between the opposing surfaces of adjacent clamping members; and draw bolts connecting said wedges and adapted to draw them each toward the other, whereby said clamping members are separated and pressed into forcible engagement with the coils and pole pieces.

8. In a rotary field magnet having polar projections provided with suitable windings; the combination of a set of clamping members covering the outer exposed portions of said windings; wedging members interposed between adjacent clamping members; and means for actuating said wedging members.

9. In combination, a rotating core provided with radially extending portions, windings surrounding said portions, and expansible braces between adjacent sides of adjacent windings, each brace comprising a member for engaging one winding, a second member for engaging the other winding, and means for spreading said members apart, said means comprising a wedge shaped block located between said members.

10. In combination, a core having portions to be surrounded by windings, windings surrounding said portions, and braces for forcibly holding said windings against said portions, said braces comprising a member engaging one winding, a second member engaging the other winding, and wedging means for spreading said members.

In testimony whereof I affix my signature in the presence of two witnesses.

CHARLES A. BACKSTROM.

Witnesses:
LEVERETT C. WHEELER,
JAS. B. ERWIN.